US012697682B2

(12) United States Patent
Wu

(10) Patent No.: US 12,697,682 B2
(45) Date of Patent: Aug. 4, 2026

(54) POLYCRYSTALLINE DIAMOND (PCD) LASER LAPPING MACHINE

(71) Applicant: II-VI Delaware, Inc., Wilmington, DE (US)

(72) Inventor: Xiquan Wu, Suzhou City (CN)

(73) Assignee: II-VI Delaware, Inc., Wilmington, DE (US)

(*) Notice: Subject to any disclaimer, the term of this patent is extended or adjusted under 35 U.S.C. 154(b) by 755 days.

(21) Appl. No.: 18/158,661

(22) Filed: Jan. 24, 2023

(65) Prior Publication Data

US 2023/0234164 A1 Jul. 27, 2023

Related U.S. Application Data

(60) Provisional application No. 63/267,224, filed on Jan. 27, 2022.

(51) Int. Cl.
*B23K 26/08* (2014.01)
*B23K 26/142* (2014.01)
*B23K 26/36* (2014.01)

(52) U.S. Cl.
CPC ...... *B23K 26/0823* (2013.01); *B23K 26/0869* (2013.01); *B23K 26/142* (2015.10); *B23K 26/36* (2013.01)

(58) Field of Classification Search
CPC ............ B23K 26/0823; B23K 26/0869; B23K 26/0884; B23K 26/0876; B23K 26/36; B23K 26/142
See application file for complete search history.

(56) References Cited

U.S. PATENT DOCUMENTS

| | | | | |
|---|---|---|---|---|
| 4,563,565 | A * | 1/1986 | Kampfer ............ | B23K 26/0823 219/121.72 |
| 5,504,303 | A | 4/1996 | Nagy | |
| 8,969,758 | B2 * | 3/2015 | Brunner ................ | B23K 26/36 219/121.68 |
| 9,255,888 | B2 * | 2/2016 | Honda ............... | G01N 21/8851 |
| 9,440,314 | B2 * | 9/2016 | Devers ................ | B23K 26/348 |

(Continued)

FOREIGN PATENT DOCUMENTS

| CN | 204524545 U | 8/2015 |
|---|---|---|
| CN | 113172342 A | 7/2021 |

(Continued)

*Primary Examiner* — Alain Chau
(74) *Attorney, Agent, or Firm* — TraskBritt

(57) ABSTRACT

A laser lapping machine has a platform for supporting and rotating a product, and a laser device for transmitting a laser beam onto the surface of the product. The product may contain polycrystalline diamond, and the platform and the laser device may be configured to move a cutting point along a spiral path across the product surface. A process for removing material, such as polycrystalline diamond material, from a surface of a product is also described. The process includes transmitting a laser beam onto the product surface to remove the material at a cutting point, rotating the product surface relative to the laser beam, and causing the cutting point to move in a radial direction. According to one aspect of the present disclosure, rotation of the platform and radial movement of the laser beam cause the cutting point to move along a spiral path across the product surface.

21 Claims, 4 Drawing Sheets

(56)  References Cited

U.S. PATENT DOCUMENTS

| | | | | |
|---|---|---|---|---|
| 9,488,596 | B2 * | 11/2016 | Honda | G01N 21/9501 |
| 9,682,441 | B2 * | 6/2017 | Thorson | B23K 26/0869 |
| 9,770,784 | B2 * | 9/2017 | Pluess | B23K 26/0823 |
| 10,710,200 | B2 * | 7/2020 | Tanaka | B23K 26/3576 |
| 11,334,047 | B2 * | 5/2022 | Koehler | H01J 37/30 |
| 2011/0095005 | A1 * | 4/2011 | Brunner | B23K 26/36 |
| | | | | 219/121.68 |
| 2011/0220625 | A1 * | 9/2011 | Pluss | B23K 26/0823 |
| | | | | 219/121.72 |
| 2013/0256279 | A1 | 10/2013 | Morikazu | |
| 2014/0124486 | A1 * | 5/2014 | Devers | B23K 26/042 |
| | | | | 219/121.45 |
| 2015/0258632 | A1 * | 9/2015 | Pluess | B23K 26/38 |
| | | | | 219/121.72 |
| 2016/0346871 | A1 * | 12/2016 | Thorson | B23K 26/0608 |
| 2019/0358748 | A1 * | 11/2019 | Tanaka | B23K 26/16 |
| 2019/0362992 | A1 * | 11/2019 | Monodane | B23K 26/0823 |
| 2020/0201281 | A1 * | 6/2020 | Koehler | B23K 26/38 |
| 2021/0242010 | A1 | 8/2021 | Tanoue | |

FOREIGN PATENT DOCUMENTS

| | | | | | |
|---|---|---|---|---|---|
| CN | 113182676 | A | * | 7/2021 | B23K 26/702 |
| DE | 69526037 | T2 | | 5/2002 | |
| EP | 3385014 | A1 | * | 10/2018 | B23B 27/20 |
| GB | 2583099 | A | | 10/2020 | |
| JP | H03264181 | A | * | 11/1991 | B23K 26/00 |
| JP | H06170571 | A | * | 6/1994 | B23K 26/3576 |
| WO | 2020090902 | A1 | | 5/2020 | |
| WO | 2021010286 | A1 | | 1/2021 | |
| WO | 2021199874 | A1 | | 10/2021 | |

* cited by examiner

POLYCRYSTALLINE DIAMOND (PCD) LASER LAPPING MACHINE

This application is a continuation of U.S. patent application Ser. No. 18/158,661, filed Jan. 24, 2023, which claims priority to United States Provisional Patent Application No. 63/267,224, filed Jan. 27, 2022, the disclosure of each of which is hereby incorporated herein in its entirety.

BRIEF SUMMARY

The present disclosure relates to laser equipment and methods for processing (especially lapping), polishing, and/or contouring surfaces which contain very hard material, such as polycrystalline diamond (PCD) material.

The present disclosure relates more particularly to a laser processing machine which has a platform for supporting and rotating a product, and a laser device for transmitting a laser beam onto the surface of the product. According to one aspect of the present disclosure, the product may contain polycrystalline diamond, and the platform and the laser device are configured to move a cutting point along a spiral path across the product surface.

The present disclosure also relates to a process for controllably removing material, such as polycrystalline diamond material, from a circular surface of a product. The process may include supporting the product on a rotatable platform, transmitting a laser beam onto the product surface to remove the material at a cutting point, rotating the platform to rotate the surface relative to the laser beam, and moving the laser beam to move the cutting point in a radial direction relative to the surface. According to one aspect of the present disclosure, the rotation of the platform and the radial movement of the laser beam cause the cutting point to move along a spiral path across the product surface.

BRIEF DESCRIPTION OF THE DRAWINGS

Throughout the drawings, like elements are designated by like reference numerals and other characters. The drawings show non-limiting examples for purposes of illustration and explanation of the present disclosure, and are not drawn to scale.

DETAILED DESCRIPTION

Figure 1:
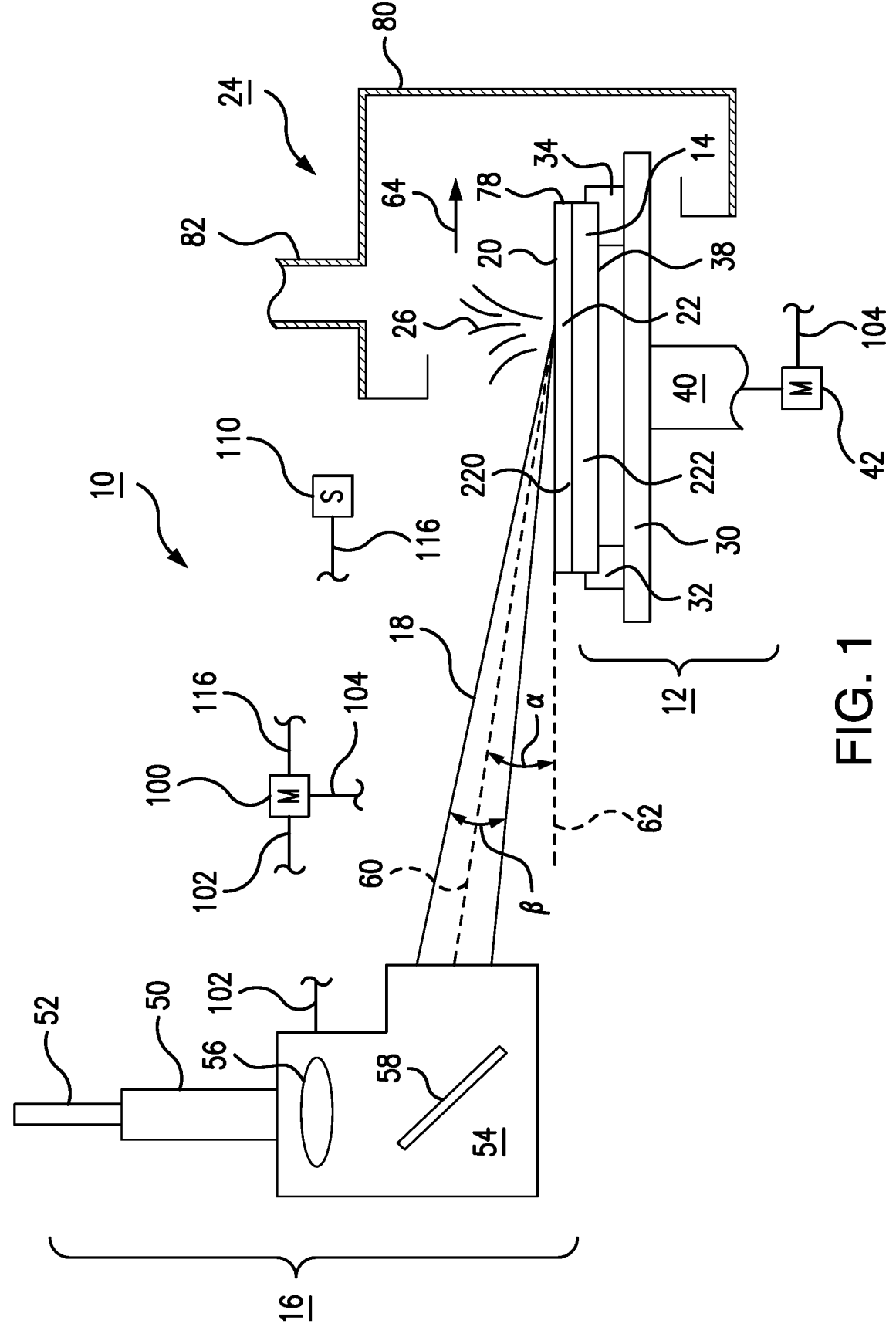
FIG. 1 is a schematic side view of a laser lapping machine constructed in accordance with the present disclosure.

FIG. 1 shows an example of a laser lapping machine 10 constructed in accordance with the present disclosure. The illustrated machine 10 has a turntable 12 for supporting a polycrystalline diamond (PCD) disk 14 (an example of a product), and a laser apparatus 16 (an example of a laser device) for generating, focusing, and aiming a laser beam 18. In operation, the laser beam 18 removes PCD material from the circular top surface 20 of the disk 14, at a movable cutting point 22.

The illustrated machine 10 also has an exhaust system 24 for removing debris and gaseous products 26 from the machine 10. The debris and gaseous products 26 are created by the energy of the laser beam 18 incident on the top surface 20 of the disk 14, at the cutting point 22.

The turntable 12 may have a platform 30 with three seats 32, 34, 36 (FIG. 2) for supporting the PCD disk 14 within the machine 10. If desired, there may be fewer or more than three such seats; however, the use of three seats 32, 34, 36 may be desired to prevent wobbling or misalignment of the disk 14 relative to the platform 30, which could otherwise occur if the bottom surface 38 (FIG. 1) of the disk 14 is not perfectly planar.

The platform 30 is supported on and rotated by a suitable spindle 40. If desired, suction-gas pathways (not illustrated) may be located within the spindle 40 for use in securing the disk 14 to the platform 30 by suction. The rate of rotation of the platform 30 may be controlled by a suitable motor 42.

The laser apparatus 16 may include, for example, a laser head 50 for generating the laser beam 18, a fiber-optic device 52 for providing laser energy to the laser head 50, and a suitable beam formation apparatus 54 for focusing the laser beam 18 on the cutting point 22. The beam formation apparatus 54 may have suitable beam shaping and guiding elements, such as one or more focusing lenses 56 and one or more mirrors 58. The wavelength 2 of the laser beam 18 may be, for example, 1064 nm ($\lambda$=1064 nm).

In operation, the laser beam 18 may be in the form of a cone which converges around a central axis 60. The angle $\alpha$ between the central axis 60 of the laser beam 18 and a top surface plane 62 which contains the top surface 20 of the PCD disk 14 is greater than one-half of the convergence angle $\beta$ of the cone-shaped laser beam 18 ($\alpha > \frac{1}{2}\beta$). Within that constraint, however, the central axis 60 may be as nearly parallel to the top-surface plane 62 as practicable.

The angle $\alpha$ at which the laser beam 18 attacks the top surface 20 of the disk 14 should be shallow so that debris created by the laser energy moves in the direction of arrow 64 and does not accumulate around the cutting point 22. If the attack angle $\alpha$ were 90°, or close to 90°, the laser beam 18 would undesirably cut too deeply into the PCD material of the disk 14. In a preferred configuration, the laser beam 18 forms a nearly-horizontal glancing angle $\alpha$ relative to the top surface plane 62. The glancing angle $\alpha$ may be, for example, in the range of from 3° to 7° ($3° \leq \alpha \leq 7°$).

In operation, the laser apparatus 16 moves the laser beam 18 so that the cutting point 22 attacked by the laser beam 18 moves in an outward radial direction 70 (FIG. 2) of the disk 14. For example, the cutting point 22 initially may be at point A, then at point B, and then at point C, with the cutting point 22 moving smoothly from point A to point B, and then to point C. At the same time, the disk 14 is rotated by the platform 30 in an angular direction 72, such that the cutting point 22 covers essentially the entire top surface 20 of the PCD disk 14 along a single spiral path (illustrated schematically in FIG. 2 by spiral path 74). The starting point A for the spiral path 74 may be confirmed at the beginning of the lapping process. If desired, the resulting spiral path 74 may be visually confirmed, by microscopic detection, after the lapping process is completed.

The manner in which the cutting point 22 travels along spiral path 74 is advantageous. Among other things, it may be used to provide the top surface 20 of the disk 14 with a slightly conical configuration, where the elevation of the cutting point 22 near the surface center A, 76 is higher than cutting points 22 near the perimeter 78 of the disk 14. Thus, the illustrated laser lapping machine 10 may be used to contour the top surface 20 to a large or small extent.

If desired, the laser beam 18 may be used to create a rounded chamfer at the disk perimeter 78. If desired, the surface center 76 may have a slightly greater elevation (thickness in a direction orthogonal to the top surface plane 62) than other locations on the top surface 20. If desired, the machine 10 may be configured to form final disks with flat, convex, or concave surfaces. Differences in elevation within the processed surface of a final product may be in the range of from 10 μm to 60 μm, or more.

Referring again to FIG. 1, the exhaust system 24 may include a shroud 80 and a chimney 82. The shroud 80 may surround most of the platform 30 and the disk 14, and may be positioned to receive, and remove from the machine 10, any debris that is removed from the top surface 20 of the PCD disk 14 by the laser beam 18. In operation, debris tends to be expelled upward from the top surface 20 as in the eruption of a volcano. Compressed air (not illustrated) may be used to move the debris from the area around the cutting point 22 and into the shroud 80.

The chimney 82 may be configured to exhaust (that is, remove from the machine 10) high-temperature gaseous and particulate materials created by the laser beam 18 working on the top surface 20. In particular, the chimney 82 may be used to draw fire and smoke away from the disk 14, which may help to keep the machine 10 clean.

If desired, all or most of the machine 10, including at least the turntable 12 and the exhaust system 24, may be located within a protective sound- and temperature-insulating enclosure or cabinet (not illustrated). The exhaust system 24 may be used to safely remove hot air, gaseous products, and particulate debris from the enclosure/cabinet. The debris may be separated from air and gaseous products by a micron filter (not illustrated), if desired. An air quality monitor (not illustrated) may be used, if desired, to ensure that the exhaust system 24 is working properly.

An advantage of the illustrated laser lapping machine 10 is that the debris and gaseous products created by the energy of the laser beam 18 are environmentally friendly. The machine 10 does not create any substantial consumables or waste materials that need to be specially handled.

The rotational speed of the disk 14 (in the angular direction 72), the rate at which the laser beam 18 is moved to cause the cutting point 22 to move in the radial direction 70, the attack angle α, and the intensity of the laser beam 18 may be controlled by a suitable controller 100 (FIG. 1) which is operatively connected to the motor 42 and the laser apparatus 16 by suitable control lines 102, 104. In operation, the rotational speed of the disk 14, the rate at which the cutting point 22 moves in the radial direction 70, and the attack angle α may be controlled by the controller 100 to control the shape of the final product.

Figures 2, 3:
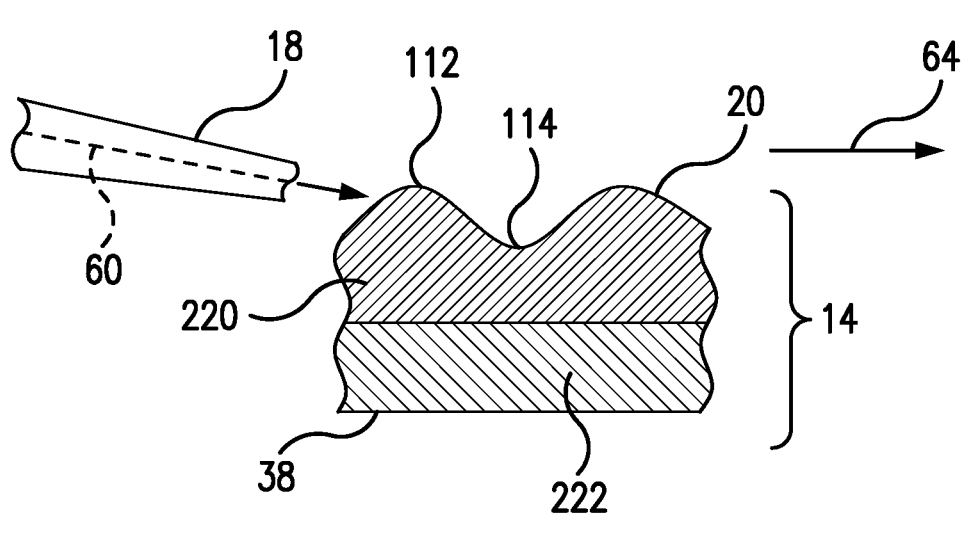
FIG. 2 is a top view of a portion of the machine shown in FIG. 1.
FIG. 3 is a partial cross-sectional view, showing portions of a laser beam and a polycrystalline diamond (PCD) disk within the machine shown in FIG. 1, taken along the line 3-3 shown in FIG. 2.

If desired, the machine 10 may also include a light sensor and/or sound sensor 110 for sensing light characteristics and/or audio volume near the cutting point 22. Referring now to FIG. 3, when the top surface 20 of the disk 14 is not smooth, there will be times when the laser beam 18 is focused on a relatively high-elevation region 112, during which the laser beam 18 actively cuts into or through the polycrystalline diamond (PCD) material, and other times when the focus of the laser beam 18 is over a low-elevation region 114, during which the laser beam 18 does not actively cut into or through the PCD material.

When the laser beam 18 actively cuts into or through the PCD material, light (produced by energetic vaporization) and sound are generated by the destructive energy of the laser beam 18. The light sensor and/or sound sensor 110 may detect such differences in light and/or sound and send corresponding signals on a suitable control line 116 to the controller 100.

The controller 100 may use the signals (116) from the light sensor and/or sound sensor 110 to control the rate at which the cutting point 22 moves on spiral path 74. That is, the cutting point 22 may move relatively slowly (at speed A) on spiral path 74 (relative to the top surface 20) when active cutting of the top surface 20 is occurring, and more quickly (at speed B (B>A)) when active cutting is not occurring. As a result, the lapping, or other desired processing, of the top surface 20 of the PCD disk 14 may be performed more quickly and efficiently, compared to a situation where the movement of the cutting point 22 is the same for the entire process.

Figure 4:
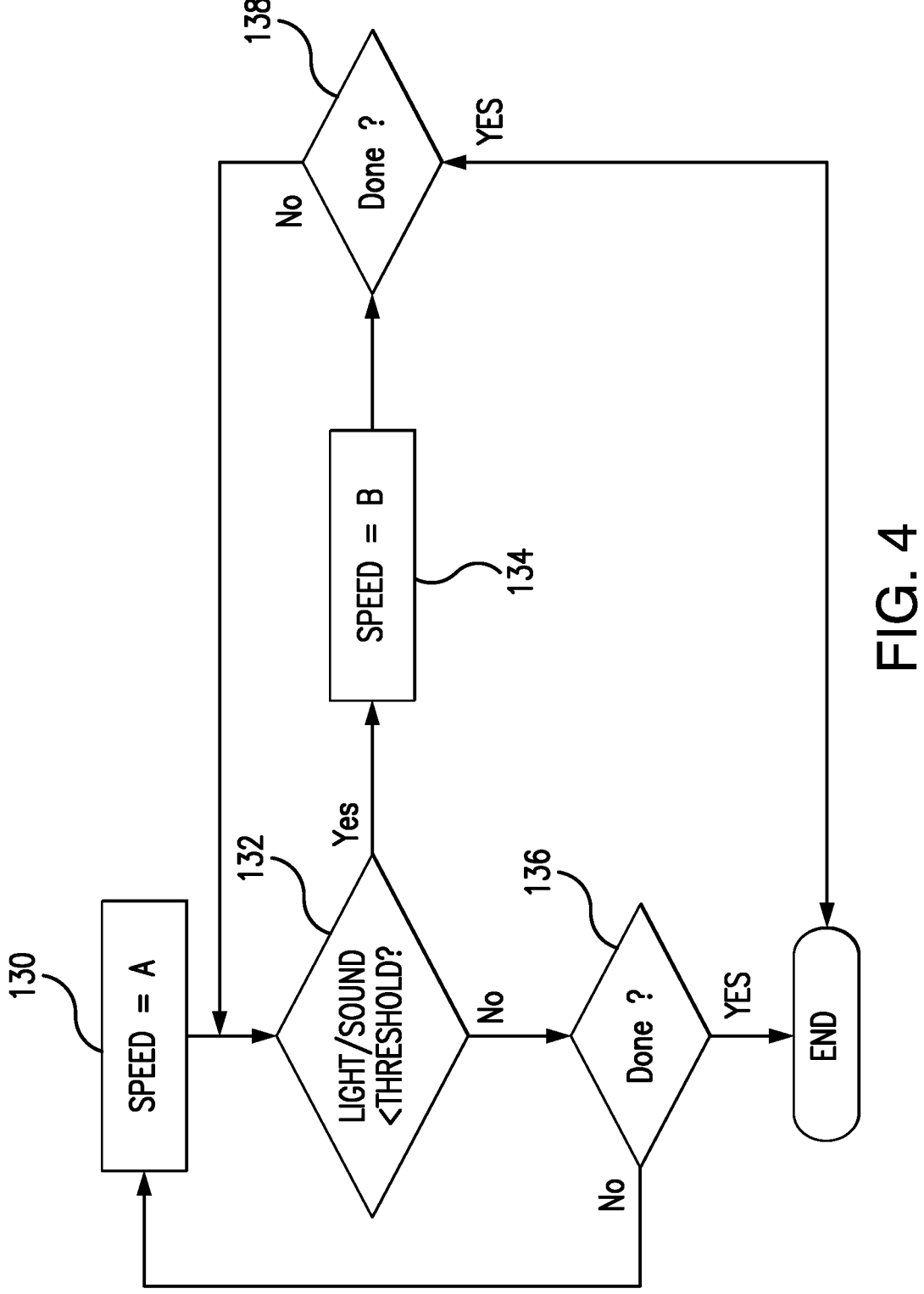
FIG. 4 is a flowchart for a method of operating, or controlling, the machine shown in FIG. 1.

The process algorithm is illustrated in FIG. 4. At the beginning of the process, the lapping speed is equal to the first lapping speed A (step 130). When the light sensor and/or sound sensor 110 monitors or detects light and/or sound less than a threshold value (Yes from step 132), the lapping speed is increased to the second lapping speed B (step 134).

When the light sensor and/or sound sensor 110 monitors or detects light and/or sound greater than or equal to a threshold value (No from step 132), the lapping speed is decreased to, or maintained at, the first lapping speed A (step 130, after No from step 132 and step 136). In other words, the movement of the relative position of the laser beam 18 along the spiral path 74 may be increased when the laser beam 18 is not cutting any PCD material. This feedback control process ends when the whole top surface 20 of the disk 14 is processed (Yes from step 136 or step 138).

The monitoring of the light and/or sound by the sound sensor 110 may also be used to trigger an alarm in the event the machine 10 malfunctions.

Figure 5:
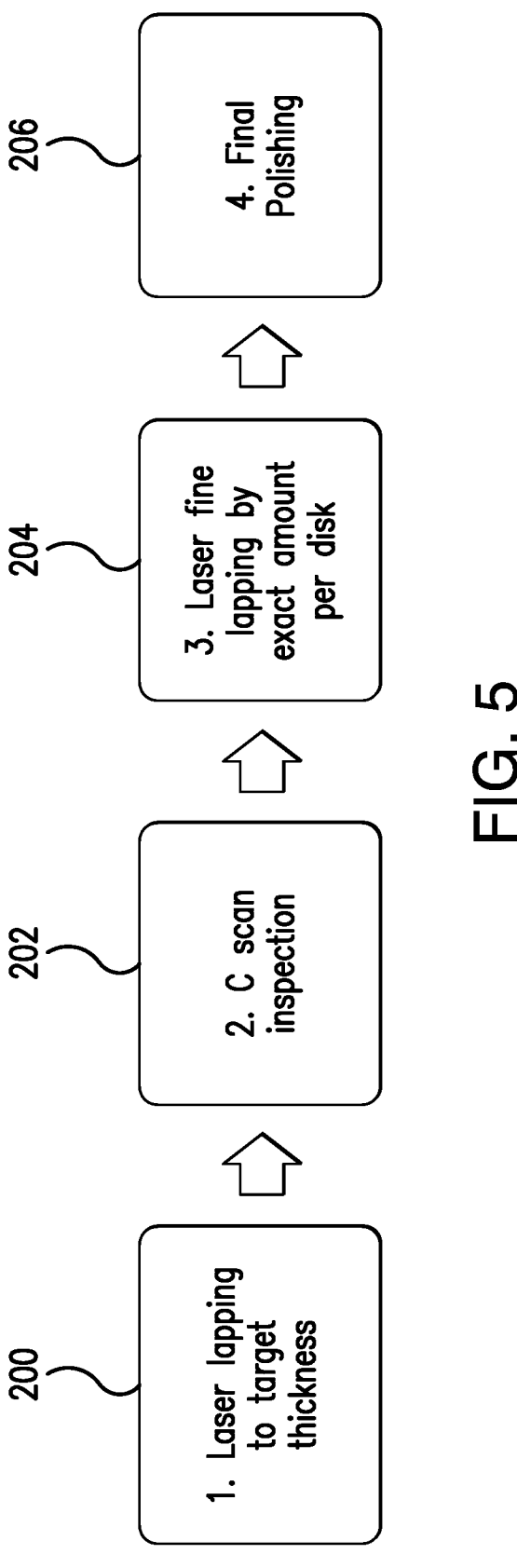
FIG. 5 is a flowchart for a multi-step method of using the machine shown in FIG. 1.

Referring now to FIG. 5, the top surface 20 of the disk 14 may be processed in multiple, successive steps. First, the top surface 20 may be lapped by the laser beam 18 to a target thickness (step 200). Then, the configuration of the top surface 20 is determined by an ultrasonic c-scan, a touch probe, or a laser depth-sensor (step 202). Then, the top surface 20 is further subjected to fine surface lapping to reduce the profile of the top surface 20 from what is detected during the inspection (that is, during step 202) to the desired profile (step 204).

Performing steps 200, 202, 204 in the indicated order may be especially important where successive disks 14 processed in the machine 10 have different starting profiles.

After the fine lapping step 204, the disk 14 may be subjected to final polishing (step 206), which may involve chemical and/or mechanical polishing, to produce the desired finished product.

According to a preferred aspect of the present disclosure, disks may be automatically loaded into and handled within the illustrated machine in an automated, high-throughput process. For example, plural raw disks may be located in one or more stacks on a loading dock (not illustrated) within the insulated enclosure/cabinet. The disks may have nearly the same thickness. An operator may then specify a quantity of disks to be processed, a starting height position, and a desired removal thickness. The disks may then be loaded on the platform 30, one at a time, by a suitable robotic arm, and processed one at a time, and processing data may be collected for each individual disk automatically. All of the disks (for example, up to twenty-five disks) may be processed to a desired precise thickness and contour with only one step of loading disks onto the loading dock being performed by the operator.

An advantage of the laser lapping process described herein is that the surface processing may be performed radially outwardly all the way to the perimeter 78 of the disk 14, such that the whole disk 14 may be configured for subsequent product use. An electrical-discharge machining (EDM) process, in contrast, may leave a disk with an unprocessed (and therefore unusable) peripheral edge with a width of up to about 5 mm. Moreover, with EDM, it is difficult to control surface shape and removal thickness due to variation in the erosion rate with time and types of material and other erosion parameters. Disadvantages associated with EDM processing include: a) not being able to achieve a desired surface shape; and b) difficulty with controlling the removal amount, which can reduce product yield.

According to one aspect of the present disclosure, the PCD material of the disk 14 may be located only within a top portion 220 (FIG. 1) of the disk 14, while a lower portion 222 of the disk 14 may be formed of tungsten carbide (WC) or some other suitable material.

The foregoing has been a description of examples of the present disclosure. Although the examples are intended to be illustrative of the present disclosure, the present disclosure should not be limited thereby. For example, although the present disclosure has been described in connection with a relatively large-diameter, thin disk 14, the machine 10 may also be configured to process cylinder-shaped products, or noncircular parts such as rectangular plates. The laser lapping machine 10 described by way of example herein can lap not only circular parts, but also rectangular products, and products having other shapes. If desired, square parts can be mounted on the round platform 30 for surface processing. If desired, equipment and techniques like those described herein may be used to machine (or profile) square or raw rods into cylindrical parts.

Moreover, the present disclosure may be applicable to methods of lapping and otherwise processing materials besides polycrystalline diamond (PCD), especially other very hard materials, such as, but not limited to, synthetic monocrystalline diamond (MCD) and boron nitride (BN).

What is claimed as new and desired to be protected by Letters Patent of the United States is:

1. A laser processing machine comprising:
   a platform configured to support and rotate a product;
   a laser device configured to transmit a laser beam onto a top surface of the product, the laser beam having: an angle $\alpha$ between a central axis of the laser beam and a plane parallel to the platform, and a cone with a convergence angle $\beta$; and
   a controller configured to control the laser device and rotation of the platform;
   wherein the controller is configured to control the laser device and rotation of the platform to move a cutting point of the laser beam along a spiral path across the product while maintaining the angle $\alpha$: greater than one half of the convergence angle $\beta$, and in a range from 3° to 7°, inclusive.

2. The machine of claim 1, wherein the platform has three seats for supporting the product on the platform.

3. The machine of claim 1, further comprising an exhaust system for removing debris and gaseous products created by the laser beam at the cutting point.

4. The machine of claim 1, further comprising a sensor for sensing light and/or sound created by the laser beam at the cutting point.

5. The machine of claim 4, wherein the controller is operatively connected to the platform and the laser device, and wherein the controller is further configured to control a rate at which the cutting point moves along the spiral path based on signals from the sensor, such that the cutting point moves at a first speed when active cutting of the top surface is detected by the sensor and at a second speed greater than the first speed when active cutting of the top surface is not detected by the sensor.

6. A process for removing material from a top surface of a product, the process comprising:
   supporting the product on a rotatable platform;
   transmitting a laser beam at an angle $\alpha$ onto the top surface of the product to remove the material at a cutting point on the top surface of the product, the laser beam having the angle $\alpha$ between a central axis of the laser beam and a plane parallel to the platform, and a cone with a convergence angle $\beta$; and
   rotating the platform to rotate the top surface of the product relative to the laser beam, and moving the laser beam to move the cutting point in a radial direction relative to the top surface of the product, such that the cutting point follows a spiral path across the top surface of the product while maintaining the angle $\alpha$: greater than one half of the convergence angle $\beta$, and in a range from 3° to 7°, inclusive.

7. The process of claim 6, further comprising using three seats to support the product on the platform.

8. The process of claim 6, further comprising using an exhaust system to remove debris and gaseous products created by the laser beam at the cutting point.

9. The process of claim 6, further comprising using a sensor to sense light and/or sound created by the laser beam at the cutting point.

10. The process of claim 9, further comprising using the sensor to control a speed at which the cutting point moves relative to the top surface of the product.

11. The process of claim 9, further comprising controlling a rate at which the cutting point moves along the spiral path based on signals from the sensor, such that the cutting point moves at a first speed when active cutting of the top surface is detected by the sensor and at a second speed greater than the first speed when active cutting of the top surface is not detected by the sensor.

12. A laser lapping process for removing polycrystalline diamond material from a top surface of a product, the process comprising:
   supporting the product on a rotatable platform;
   transmitting a laser beam at an angle $\alpha$ onto the top surface of the product to remove the polycrystalline diamond material at a cutting point on the top surface of the product, the laser beam having the angle $\alpha$ between a central axis of the laser beam and a plane parallel to the platform, and a cone with a convergence angle $\beta$; and
   rotating the platform to rotate the top surface of the product relative to the laser beam, and simultaneously moving the laser beam to move the cutting point in a radial direction relative to the top surface of the product, such that the cutting point follows a spiral path across the top surface of the product while maintaining the angle $\alpha$: greater than one half of the convergence angle $\beta$, and in a range from 3° to 7°, inclusive.

7

13. The laser lapping process of claim 12, further comprising using three seats to support the product on the platform.

14. The laser lapping process of claim 12, further comprising using an exhaust system to remove debris and gaseous products created by the laser beam at the cutting point.

15. The laser lapping process of claim 12, further comprising using a sensor to sense light and/or sound created by the laser beam at the cutting point.

16. The laser lapping process of claim 15, further comprising using the sensor to control the speed at which the cutting point follows the spiral path.

17. The laser lapping process of claim 15, further comprising controlling a rate at which the cutting point moves along the spiral path based on signals from the sensor, such that the cutting point moves at a first speed when active cutting of the top surface is detected by the sensor and at a second speed greater than the first speed when active cutting of the top surface is not detected by the sensor.

18. The laser lapping process of claim 12, wherein the product is a disk.

19. The laser lapping process of claim 12, wherein the product is a cylinder.

20. The laser lapping process of claim 12, wherein the polycrystalline diamond material is located within a top layer of the product, and wherein a second layer of the product does not contain polycrystalline diamond material.

21. The laser lapping process of claim 12, wherein the product includes one or more other forms of diamond or other super-hard materials, and is shaped as a plate or rod, wherein the plate is one of round or rectangular or wherein the rod is one of round or square, or in an irregular raw form.

* * * * *